United States Patent [19]
Manor

[11] 3,951,378
[45] Apr. 20, 1976

[54] VALVE
[75] Inventor: Aharon Manor, Rehovoth, Israel
[73] Assignee: Oramt Turbines Ltd., Israel
[22] Filed: Mar. 8, 1974
[21] Appl. No.: 449,479

[30] Foreign Application Priority Data
Mar. 9, 1973 Israel.................................... 41742

[52] U.S. Cl................................ 251/65; 251/129;
137/625.65; 251/89
[51] Int. Cl.² ...................................... F16K 31/08
[58] Field of Search ................. 251/65, 66, 129, 89;
137/625.65

[56] References Cited
UNITED STATES PATENTS

| | | | |
|---|---|---|---|
| 3,212,751 | 10/1965 | Hassa..................................... | 251/65 |
| 3,368,788 | 2/1968 | Padula.................................. | 251/65 |
| 3,379,214 | 4/1968 | Weinberg........................... | 251/65 X |
| 3,675,171 | 7/1972 | Kirk..................................... | 251/65 X |

Primary Examiner—Arnold Rosenthal
Attorney, Agent, or Firm—Donald M. Sandler

[57] ABSTRACT

A manually resettable valve comprises a valve body having a cylindrical portion with a wetted enclosure defined by an internal coaxial aperture within which a magnetically attractable plunger is slidable between two terminal positions establishing the states of the valve. A spring urges the plunger toward a first terminal position; and an electromagnet mounted on the body and responsive to an electrical signal when the plunger is in its first terminal position magnetically attracts the plunger and moves it to a second position against the action of the spring. Finally, a permanent magnet in a magnetic circuit, whose elements include the cylindrical portion of the body and the plunger, holds the plunger independently of the electromagnet in its second terminal position thereby holding the valve in its "latched" state. Some of the elements of the magnetic circuit are manually movable relative to other of the elements for selectively disrupting the circuit and causing the permanent magnet to release the plunger whereby the spring is effective to move the plunger from its second terminal position to its first terminal position, thereby resetting the valve to its "unlatched" state.

6 Claims, 7 Drawing Figures

"UNLATCHED" state

U.S. Patent   April 20, 1976   3,951,378
Fig. 1
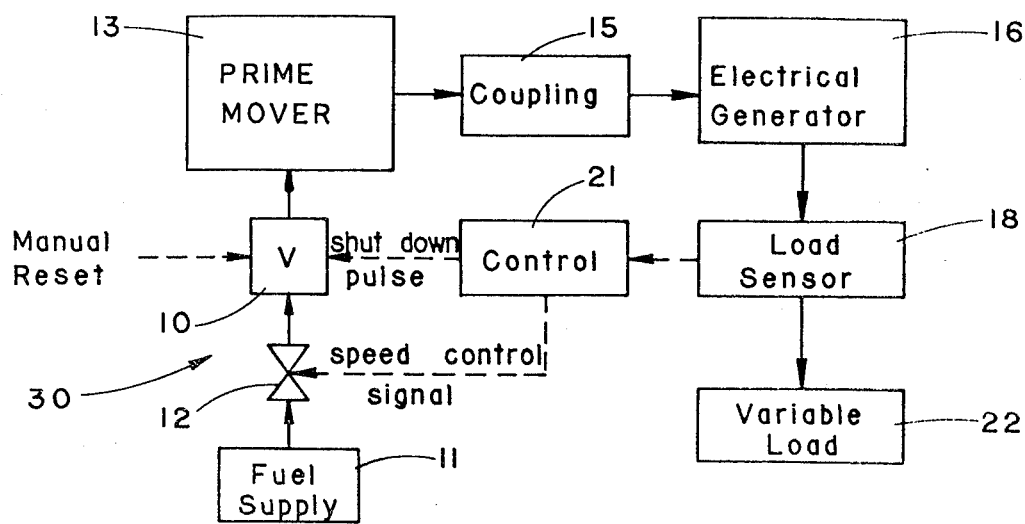
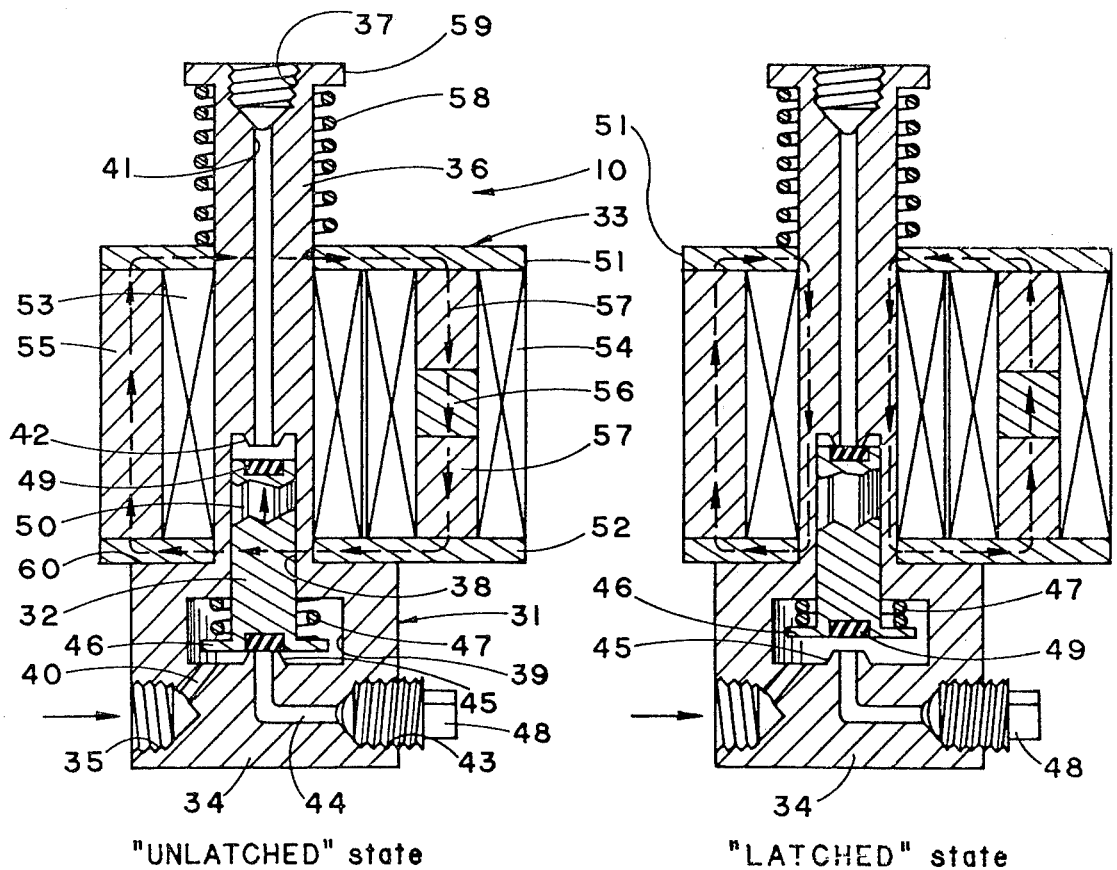
"UNLATCHED" state       "LATCHED" state
Fig. 2               Fig. 3

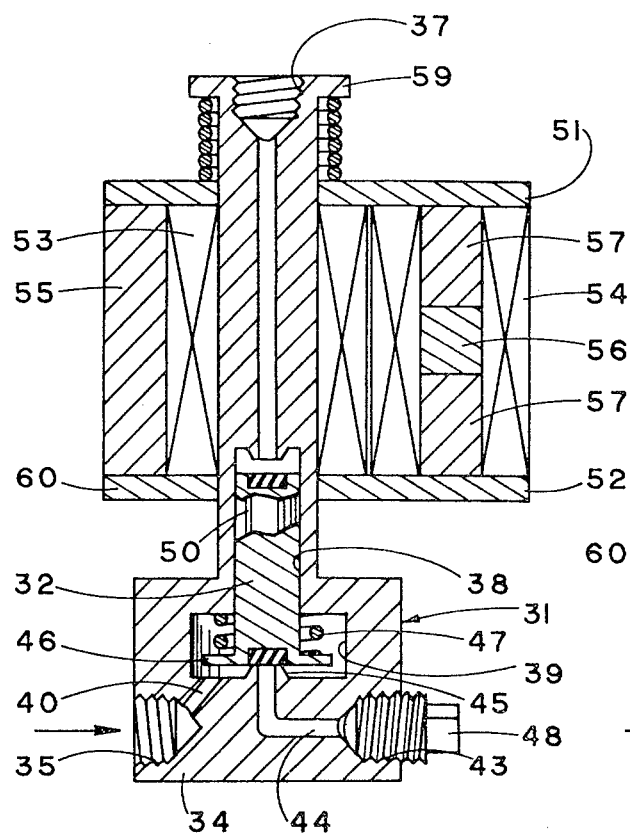
Fig. 5
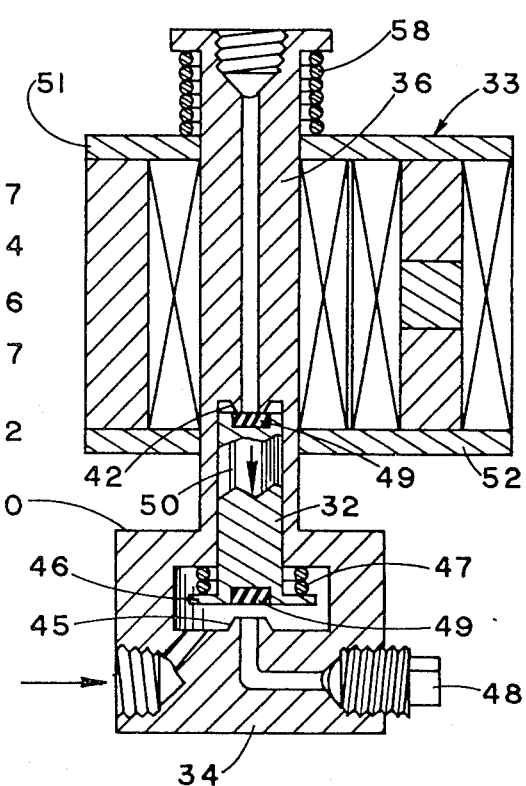
Fig. 4
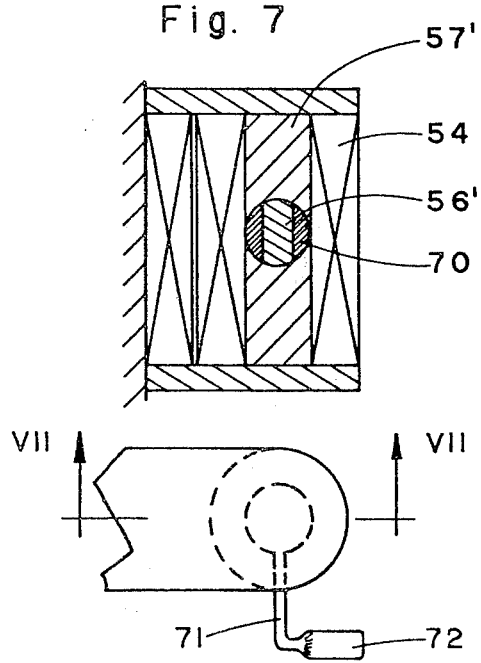
Fig. 7
Fig. 6

VALVE

This invention relates to a manually resettable valve, and more particularly to a resettable valve in which the movable member of the valve within the wetted enclosure thereof is not mechanically linked through the wetted enclosure to the exterior of the valve.

For safety purposes, the gas or liquid fuel line for a boiler, oven, refractory, chemical processor, etc., is usually provided with a manually resettable valve that is normally open, but which is closed automatically upon detection of an incipient catastrophic failure in the system. Such valve cannot be opened once closed, except by a manual resetting operation. The requirement for human intercession, once an automatic shut-down occurs, permits an investigation and correction of the cause of the shut-down to be carried out before a restart of the system is attempted. For example, loss of a pilot flame in a gas burner installation warrants automatic shut down; and the function of a reset valve in this environment is to respond to detection of such loss by closing and depriving the burner of fuel. Reopening of the valve requires human intercession, thus calling attention to and providing an opportunity for correcting the situation that gave rise to the loss of the pilot flame.

Generally, manually reset valves include a movable member located within the wetted enclosure of the valve (i.e. the interior of the valve through which the fual flows) and capable of being latched in a position in which fuel flows through the valve. When automatic shut-down takes place, the movable member is unlatched and spring-driven to a released position at which fuel flow is interrupted. In many forms of manual reset valves, the latching of the movable member is achieved by a movable mechanical latch plate, spring urged into an engagement with the movable member, but movable out of latching engagement by a change in state of a solenoid associated with the latch. Thus, energising or de-energising of the solenoid, depending on how the valve is organized, can move the latch plate out of engagement with the movable member, unlatching the same and closing the valve.

In order to reset or open the valve, the movable member must be physically moved against its spring bias; and this movement is usually carried out by a mechanical linkage connected to the movable member and extending through the wetted enclosure of the valve body to the exterior thereof. Thus, an operator is required to manually operate the linkage and move the movable member against its spring bias until the latch plate again engages the movable member and holds the latter in open position. This arrangement requires the use of a seal where the linkage passes through the wetted enclosure of the valve, and is thus unsatisfactory in any installation where no leakage from the wetted enclosure can be tolerated.

Valves are known, however, wherein a movable member within the wetted enclosure of a valve can be actuated without a direct mechanical linkage by utilizing a selectively adjustable magnetic field that suitably interacts with the movable member. Thus, the movable member may be held in an initial position against the action of a spring by a permanent magnet that attracts the movable member such that the valve has the desired state (i.e., open or closed). But the application of a pulse of predetermined amplitude and duration to a coil associated with the permanent magnet will disrupt its ability to attract the movable member which will be released and spring urged to a second position thereby changing the state of the valve. To restore the valve to its original state, another pulse of opposite polarity applied to the coil will move the movable member against the spring bias until the permanent magnet is once again effective to hold the movable member in its initial position.

Such a magnetically operable valve is not suitable for use as a reset valve in any installation where the power for the coil is derived from the system being protected. For example, if the system is a self-contained power plant, such as shown and described in U.S. Pat. No. 3,393,515, electrical power is available only where the power plant is operating; the electrical power being generated when an automatic shut-down situation is detected can be applied to the coil of a magnetically operable valve in a fuel line to effect its closing. After shut-down has occurred, and an operator has examined the power plant and corrected the problem that gave rise to the shut-down, restarting cannot be effected by pulsing the coil to open the valve because no power is available from the power plant. For this reason, it has not been practicable, heretofore, to employ a magnetically operable valve in a manual reset type of operation.

It is therefore an object of the present invention to provide a new and improved magnetically operable valve wherein resetting of the valve can be achieved manually as well as electrically without requiring access through the wetted enclosure.

According to the present invention, there is provided a manually resettable valve comprising a valve body having a cylindrical portion with a wetted enclosure defined by an internal coaxial aperture within which a magnetically attractable plunger is slidable between two terminal positions establishing the states of the valve; a spring urging the plunger toward a first terminal position; an electromagnetic mounted on the body and responsive to an electrical signal when the plunger is in its first terminal position for magnetically attracting the plunger and moving it to a second position against the action of the spring; and a permanent magnet in a magnetic circuit whose elements include the cylindrical portion of the body and the plunger for holding the plunger independently of the electromagnet in its second terminal position, thereby holding the valve in its "latched" state; some of the elements of the magnetic circuit being manually movable relative to other of the elements for selectively disrupting the circuit and causing the permanent magnet to release the plunger whereby the spring is effective to move the plunger from its second terminal position to its first terminal position, thereby resetting the valve to its "unlatched" state.

By reason of its construction, a valve according to the present invention is ideally suited for use as an automatic shutdown valve in the fuel line of a self-contained power plant where electrical power is available only while the power plant is in operation. Thus, the valve may be organized such that the valve is open, permitting fuel to be furnished from a fuel tank to a burner that is part of the power plant, when the plunger of the valve is in its first terminal position whereby the valve is in its unlatched state. When a dangerous condition within the power plant is detected, the resultant automatic shut-down pulse may be applied to the electromagnetic of the valve thereby moving the plunger from its first position to its second position where it is latched by the permanent magnet at a position at which the valve prevents the flow of fuel to the burner. The plunger will remain latched until the magnetic circuit associated with the permanent magnet is disrupted. This disruption can occur without requiring power to reversely pulse the electromagnet by reason of the provision of movable elements in the magnetic circuit. An operator, having investigated the cause of the dangerous condition within the power plant, need only manually move the movable elements of the magnetic circuit to effect release or unlatching of the plunger which is free to move back to its first terminal position at which the fuel line is once more connected to the burner of the power plant. If auxiliary power is available, resetting can be achieved by reversely pulsing the electromagnet, but the possibility of resetting the valve in this manner should be precluded when a truly manual reset operation is desired.

Various elements of the magnetic circuit may be made movable for the purpose of effecting the release of the plunger. For example, the permanent magnet and/or the constituent parts of the electromagnet may be made movable relative to the remainder of the magnetic circuit. In the preferred embodiment of the invention, both the permanent magnet and the coil of the electromagnet are made movable. Specifically, the valve body is constructed so that its cylindrical portion extends from an enlarged portion defining a shoulder, and the manually movable elements of the magnetic circuit are contained within a housing slidable on the cylindrical portion of the body. When the housing is engaged against the shoulder, the movable elements are positioned such that the plunger is held in its second terminal position after being moved to such position by the electro-magnet, whereas when the housing is separated from the shoulder, the movable elements are positioned such that the plunger is released from its second position. Resilient means may be provided to urge the housing against the shoulder so that its normal position is such that an automatic shut-down signal applied to the electromagnet will move the plunger from its first to its second terminal position closing the valve. Resetting of the valve is achieved merely by manually moving the housing on the cylindrical portion of the body to disrupt the magnetic circuit, thereby releasing the plunger which reopens the valve.

An embodiment of the invention is illustrated by way of example in the accompanying drawing, wherein:

FIG. 1 is a block diagram of a typical self-contained power plant package showing a manually resettable valve interposed between the fuel supply and the prime mover of the power plant;

FIG. 2 is a sectional view of a valve according to the present invention showing the plunger unlatched in its first terminal position and the valve in its unlatched state; and FIG. 3 is a sectional view similar to the section shown in FIG. 2, but showing the plunger latched in its second terminal position and the valve in its latched state;

FIG. 4 is a sectional view of the valve illustrated in FIG. 3 and showing the valve in its latched state and a constituent part of the magnetic circuit moved from its position shown in FIG. 3 in preparation for resetting of the valve;

FIG. 5 is a sectional view of the valve illustrated in FIG. 4 but showing the valve in its unlatched state and before the constituent part of the magnetic circuit has been returned to its normal position; and FIG. 6 is a top view of a portion of the magnetic circuit elements showing a modification of the means by which the valve can be manually reset; and FIG. 7 is a sectional view taken along the line VII—VII in FIG. 6.

Referring now to FIG. 1 of the drawings, reference numeral 10 designated a manually resettable valve incorporated into the fuel line of a self-contained power plant 30 of the type adapted to be used on a continuous or stand-by basis at an unmanned location.

Fuel from supply 11 is furnished to a prime mover 13 by way of a control valve 12 and a manually resettable valve 10. When valves 10 and 12 are open, fuel flows to the prime mover which drives generator 16 through a coupling 15 such that power is supplied to a variable external load 22 through a load sensor 18. When the load sensor detects a change in the load 22, a suitable signal is sent to control 21 which operates control valve 12 for the purpose of increasing or decreasing the amount of fuel supplied to the prime mover in accordance with the requirements of the load. For example, when the load increases, the control 21 would increase the fuel supply to the burner.

Prime mover 13 may be a turbine operating on the products of combustion or in a closed Rankine cycle, or a diesel engine driven by liquid or gaseous fuel. Under many conditions it is essential that the fuel system be completely leak-proof. A fuel cell which utilizes oxygen and hydrogen is another example of a prime mover suitable for a highly reliable power plant wherein the fuel supply must be completely leak tight.

As a safety feature, various sensors are incorporated into the power plant 30 in order to monitor the parameters of the system and to produce an automatic shut-down signal upon detection of an incipient catastrophic failure in the system. For example when the prime mover is a turbine, the sudden loss of load may result in a run-away condition of the turbine which requires a rapid disconnection of the fuel supply from the burner of the power plant. In the case of a diesel engine, detection of an over heating of the engine coolant or detection of an over speed condition of the engine would be utilized for the purpose of shutting off the fuel supply to the engine.

While shut-down can be accomplished merely by closing valve 12 in response to an automatic shut-down signal, this expediency raises the possibility of accidentally attempting to restart the power plant before the cause of the automatic shut-down signal has been investigated and corrected. This highly dangerous situation is precluded by the provision of valve 10 which responds to an automatic shut-down signal by closing and remaining closed until manually reopened. In this manner, no fuel can be furnished to the prime mover and thus it is not possible to restart the system automatically.

Details of valve 10 are shown in FIGS. 2 and 3 to which reference is now made. Valve 10 comprises a valve body 31, plunger 32 and magnetic circuit elements 33. Body 31 includes an enlarged lower portion 34 containing an inlet 35 and a cylindrical portion 36 extending from portion 34 at a right angle to the axis of port 35, and containing axially located outlet port 37. Portion 36 also has an internal coaxial aperture 38 which extends into portion 34 and defines therewith an enlarged chamber 39. Conduit 40 interconnects port 39. Conduit 40 interconnects port 35 with chamber 39; and axially extending conduit 41 interconnects port 37 with aperture 38. Conduit 41 terminates in the centre of raised seat 42 coaxially located in aperture 38. The valve may also be provided with a third port 43 which is connected by a conduit 44 to the lower portion of chamber 39, the conduit terminating in the centre of raised seat 45. The surfaces defining the ports 35, 37 and 43, the conduits 40, 41 and 44, and the coaxial aperture 38 and chamber 39 constitute an enclosure wetted by the fluid flowing through the valve.

Plunger 32, cylindrical in nature and dimensioned to slide axially in aperture 38, has an enlarged head 46 at one end projecting into chamber 39. Head 46 forms a support for spring 46 which resiliently urges the plunger toward seat 45. Centrally located on each axial end of the plunger are counter-bored recesses containing a resilient disc 49 of a material compatible with the fluid being transferred between inlet port 35 and outlet port 37. Finally, the cylindrical surface of plunger 32 is provided with longitudinal grooves 50 to provide a plurality of communication channels between chamber 39 and conduit 41.

When plunger 32 is in its first terminal position (shown in FIG. 2) with spring 47 urging lower disc 49 of the plunger into sealing engagement with seat 45, upper disc 49 is spaced from seat 42 so that fluid in the line connected to inlet port 35 flows through conduit 40 into chamber 39 where it then flows through channels 50 and into the conduit 41 finally exiting from the outlet port 37. In this state, the valve is open and the plunger is said to be released or unlatched. As explained in detail below, no mechanical link is necessary between the exterior of the valve and the plunger in the wetted enclosure either to close the valve or to open it.

Because valve 10 is utilized in the environment shown in FIG. 1 to control the flow of fuel to a prime mover, port 43 is closed by a plug 48, although this port may be utilized as a by-pass in other environments.

Turning now to the magnetic circuit elements 33, such elements comprise a pair of flux plates 51 and 52 containing an aperture that slidably receives cylindrical portion 36 of the valve body. Sandwiched between these two flux plates is a coil assembly comprising a latch coil 53 whose opening is aligned with the apertures in the flux plates and is slidably receivable on cylindrical portion 36, a switching coil 54 eccentrically located with respect to the axis of cylindrical portion 36, a latching permanent magnet 55 extending between the flux plates, and a core assembly located within the aperture of coil 54 comprising a ferrite magnet 56 interposed between a pair of magnetic steel plugs 57 linking the flux plates 51 and 52. Magnet 56 exhibits hysteresis in that its polarity can be switched by changing the direction of current flow in coil 53. All of the components of magnetic circuit 33 are clamped together by a cover (not shown) so as to be slidable as a unit on cylindrical portion 36. Spring 58 interposed between a flange 59 located on the upper free end of cylindrical portion 36 and the top flux-plate 51, resiliently urges the magnetic circuit elements 33 downwardly on the cylindrical member 36 and into engagement with shoulder 60 defined by the connection of portion 36 with portion 34 of the valve body.

Under normal operating conditions, valve 10 is in its unlatched state as shown in FIG. 2. In this state, neither of coils 53 or 54 is energized and the polarity of magnets 55 and 56 are such that the path of least reluctance to magnetic flux (indicated by the broken arrows in FIG. 2), includes the magnet 55 and the core assembly comprising plugs 57 and 56. For example, it the upper end of magnet 55 is a north pole, the lower end of magnet 56 will be a north pole. As a consequence, very little magnetic flux will be contained within the cylindrical portion 36 extending between the two flux plates and passing through plunger 32.

When an automatic shut-down pulse occurs, current flows through the coil 53 in such a direction as to generate magnetic flux within the portion 36 serving to attract plunger 32. In addition, current also flows through coil 54 in such a direction as to overcome the flux produced by magnet 56 reversing the direction of magnetic flux in the plugs 57 whereupon the flux associated with magnet 55 is switched from the path shown in FIG. 2 and into the cylindrical portion 36 exerting an upward pull on plunger 32 as indicated by the arrow on plunger 32. The upward pull is sufficient to move the plunger from its first terminal position to its second terminal position shown in FIG. 3 at which the upper disc 49 seats in sealing relation to seat 42 thus disconnecting the inlet port 35 from the outlet port 37. In its second terminal position, the reluctance of the path through the plunger 32 is reduced, and the plunger is held by the action of magnet 55 notwithstanding the cessation of current flow through coils 53 and 54.

In order to release the plunger from its position as shown in FIG. 3, it is possible to apply to the coils 53 and 54 a pulse of current with a polarity opposite to the pulse of current corresponding to the automatic shut-down signal. As explained above, this mode of operation is not preferred because upon the shut-down of the power plant, no power is available for the coils 53 and 54. It is preferred, therefore, to have a manual reset mode of operation and this is shown in FIGS. 4 and 5 to which reference is now made. Magnetic circuit elements 33 may be manually shifted upwardly against the action of spring 58 until there is insufficient magnetic flux passing through the plunger 32 to hold the latter in its second terminal position against the action of spring 47. Thus, when elements 33 are raised, the magnetic attraction of plunger 32 is disrupted and spring 47 moves the plunger from its second terminal position back to its first terminal position as shown in FIG. 5 reconnecting inlet port 35 to the outlet port 37. When elements 33 are released, spring 58 returns them to the position shown in FIG. 2 but the plunger 32 remains at its first terminal position, the gap between seat 42 and the upper end of the plunger creating such a high reluctance that the flux path is as indicated in FIG. 2.

It should be noted that the entire wetted enclosure defined by aperture 38 and chamber 39 remains intact precluding leakage of fluid contained within the valve. Despite this isolation of plunger 32, the magnetic circuit elements 33 are effective to first move the plunger from its first terminal position at which the valve is open to its second terminal position at which the valve is closed. In addition, elements 33 maintain the plunger in the second axial position until the magnet circuit elements are displaced on portion 36 whereupon the plunger 32 is released and returns to its first terminal position reopening the valve.

The provision of port 43 is optional in the arrangement described above but may be of value in other systems where the port 43 would serve as a by-pass for the fluid being pumped into inlet 35. In such case, plug 48 would not be utilized but a line would lead from port 43 back into the fuel tank.

Instead of making all of the elements 33 displaceable to disrupt the continuity of the magnet circuit holding plunger 32 in its catched position, the upper flux plate alone may be movable. Alternatively, the magnet 55 may be displaceable laterally to remove it from the circuit.

A further alternative arrangement for moving a constituent part of the magnetic circuit is illustrated in FIGS. 6 and 7. In this modification, a permanent magnet 56' associated with the switching coil 54 is mounted in a recess provided in a cylindrical slug of ferrous material 70 which is rotatably mounted within a circular bore that passes through the core 57' of the coil 54. The axis of the bore receiving slug 70 is perpendicular to the axis of the coil 54. Projecting outwardly through the coil 54 along the axis of the slug 56' is a connecting shaft 71 which terminates in a right angle bend defining a manually graspable operating arm 72. By grasping the arm 72 and rotating it through 180°, it is possible to change the polarity of the permanent magnet 56' and thus provide a way to reset the valve when it is in its latched state. The rotation of the magnet 56' will disturb the magnetic flux flowing through the plunger 32 when the valve is in its latched state (FIG. 3) and will recreate the situation existing before the shut-down pulses were applied to the coils 53 and 54. After the magnet is rotated, the flux path will by-pass the plunger 32 and will thus permit the plunger to return from the position shown in FIG. 3 to the position shown in FIG. 2. This modification eliminates the necessity for providing the slidable magnetic circuit 33 and the return spring 58.

While the above detailed description refers to a manually resettable valve for use in a fuel line, the present invention has wider application. Consider for example, systems where general use of magnetically operable valves would be advantageous because of their inherent low power consumption (no power is required to hold the valve in either of its two permitted states). Such a use is precluded in many installations, however, because upon loss of electrical power, no means exist to restore the valve to its previous state except for a battery pack which may be impractical. With the present invention, the valve can be manually reset without relying upon a battery pack. Thus, the valve according to the present invention can be used in many installations other than those where manual intercession into the operation of a system is a part of the design philosophy.

I claim:

1. A manually resettable valve comprising a valve body having a cylindrical portion with a wetted enclosure defined by an internal coaxial aperture within which a magnetically attractable plunger is slidable between two terminal positions establishing the states of the valve; a spring urging the plunger toward a first terminal position; an electromagnet mounted on the body and responsive to an electrical signal when the plunger is in its first terminal position for magnetically attracting the plunger and moving it to a second terminal, position against the action of the spring; and a permanent magnet in a magnetic circuit whose elements include the cylindrical portion of the body and the plunger for holding the plunger independently of the electromagnet in its second terminal position thereby holding the valve in its latched state; some of the elements of the magnetic circuit being manually movable relative to other of the elements for selectively disrupting the magnetic circuit and causing the permanent magnet to release the plunger whereby the spring is effective to move the plunger from its second terminal position to its first terminal position thereby resetting the valve to its unlatched state.

2. A manually resettable valve according to claim 1 wherein the manually movable elements of the magnetic circuit include the permanent magnet.

3. A manually resettable valve, according to claim 1 wherein the manually movable elements of the magnetic circuit include the electromagnet.

4. A manually resettable valve according to claim 1, wherein the cylindrical portion of the body extends from an enlarged portion thereof and defines a shoulder, and wherein the manually movable elements of the magnetic circuit are in a housing slidable on the cylindrical portion of the body, the housing, when engaged against the shoulder positioning the movable elements such that the plunger is held in its second terminal position after being moved to such position by the electromagnet, and when separated from the shoulder, positioning the movable elements such that the plunger is released from its second terminal position, and resilient means urging the housing against the shoulder.

5. A manually resetting valve according to claim 4 including resilient means urging the housing against the shoulder.

6. A manually resettable valve according to claim 4 wherein the electromagnet includes a coil mounted on the cylindrical portion of the body.

* * * * *

UNITED STATES PATENT AND TRADEMARK OFFICE
CERTIFICATE OF CORRECTION

PATENT NO. : 3,951,378
DATED : April 20, 1976
INVENTOR(S) : Aharon Manor

It is certified that error appears in the above-identified patent and that said Letters Patent are hereby corrected as shown below:

Col. 2, line 66; Col. 3, line 59; Col. 4, line 2; Col. 5, line 68; and Col. 8, line 26; the word "unlatched" should be placed within quotation marks.

Col. 3, line 5; Col. 3, line 63; Col. 3, line 65; Col. 7, line 28; Col. 8, line 19; the word "latched" should be placed within quotation marks.

Col. 3, line 13, the word "unlatching" should be placed within quotation marks.

Col. 2, line 40, "electromagnetic" should be changed to --electromagnet--.

Col. 3, line 1; and Col. 3, line 6, "magnetic" should be changed to --magnet--.

Col. 5, line 17, change "46" to --47--.

Col. 7, line 6, change "catched" to --latched--.

Col. 8, line 14, omit the (,) after "terminal".

Col. 8, line 46, change "resetting" to --resettable--.

Signed and Sealed this

Fourteenth Day of September 197

[SEAL]

Attest:

RUTH C. MASON
Attesting Officer

C. MARSHALL DANN
Commissioner of Patents and Trademarks